E. WEINTRAUB.
RECTIFYING ALTERNATING CURRENT.
APPLICATION FILED NOV. 21, 1910.
1,134,787.
Patented Apr. 6, 1915.
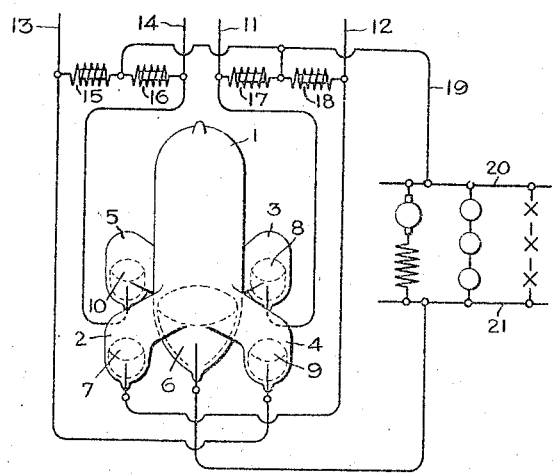
WITNESSES:
INVENTOR:
EZECHIEL WEINTRAUB,
BY
HIS ATTORNEY

UNITED STATES PATENT OFFICE.

EZECHIEL WEINTRAUB, OF LYNN, MASSACHUSETTS, ASSIGNOR TO GENERAL ELECTRIC COMPANY, A CORPORATION OF NEW YORK.

RECTIFYING ALTERNATING CURRENT.

1,134,787.  Specification of Letters Patent.  Patented Apr. 6, 1915.

Original application filed March 23, 1903, Serial No. 149,084. Divided and this application filed November 21, 1910. Serial No. 593,303.

*To all whom it may concern:*

Be it known that I, EZECHIEL WEINTRAUB, a citizen of the United States, residing at Lynn, county of Essex, State of Massachusetts, have invented certain new and useful Improvements in Rectifying Alternating Current, (division of my application, Serial No. 149,084, filed March 23, 1903,) of which the following is a specification.

My invention relates to the rectification of alternating current and comprises various improvements in the construction and arrangement of the rectifying apparatus and in the circuits and systems of distribution in connection with which the apparatus may be employed.

In rectifying alternating current I make use of a property, discovered by me, that a vapor, such for example as the vapor of mercury, produced in an exhausted receptacle by means of electrical energy passed into said receptacle through electrodes suitably located therein, is a conductor for current flowing in one direction through the vapor and a non-conductor for current tending to flow in the opposite direction. Due to this unsymmetrical conducting character of the medium an alternating electro-motive force, when impressed upon such electrodes, causes a unidirectional current to flow between the electrodes.

My invention is suitable for use in rectifying alternating current of any number of phases whether single phase or multiphase. It embodies however certain valuable features of novelty which renders its use very advantageous for the purpose of rectifying single phase current though it is expressly to be understood that the invention is not, for this reason, to be limited to use in connection with single phase systems only.

The various features of novelty which characterize my invention I have pointed out with particularity in the appended claims. The invention itself, however, will be best understood by reference to the following description taken in connection with the accompanying drawings.

As illustrative of my invention the drawings represent a rectifying apparatus for multiphase current in which a single, highly exhausted receptacle or container of glass or other suitable material is employed. This receptacle is provided with a sort of dome 1 which serves as a condensing chamber. In the lower portion of the receptacle there are provided a plurality of electrodes, formed in the present instance of bodies of mercury, contained in suitable retaining cups or depressions forming parts of laterally projecting arms or elbows 2, 3, 4, 5. An electrode or cathode 6 occupies a symmetrical position in the receptacle and ranged around it are coöperating anodes or positive electrodes 7, 8, 9, 10 in said arms or elbows. Two of these coöperating electrodes such as 7 and 8 are connected across supply mains 11 and 12 of one phase of a multiphase supply system, and the other electrodes 9 and 10 across the mains 13, 14 of the other phase of the supply system. Inductance coils 15, 16 and 17, 18 are connected in pairs, one pair across one phase and the other across the other phase of the supply system as shown. The junctions between these inductance coils are connected together and a lead 19 extends therefrom to one main 20 of the consumption circuit containing translating devices. The other lead or main 21 of the consumption circuit is connected to the main electrode 6.

To start the rectifier, the cathode or electrode 6 is brought into electrical connection with one or more of its coöperating electrodes by shaking the receptacle, or by other means. After the rectifier has been once started and is in normal operation, the presence of the inductance coils and their characteristic action has the important advantage of causing the utilization of both waves of the alternating current and of increasing the stability of the rectifier. Moreover, the location of the anodes in the lateral or side arms or tubes is of importance, in that the anodes are protected from contact with particles of mercury which may be projected upward from the cathode during operation and which might otherwise tend to fall back into or against the anodes, or from falling particles or bodies of mercury produced by condensation or otherwise in the condensing chamber. Impact of particles of mercury against an anode is a prolific cause of arcing in rectifiers and by the construction shown this difficulty is large eliminated.

The appended claims are directed to the construction of the tube or container itself but claims on broader features of my invention such as the rectifying system are not made herein but are made in other applications and especially in application, Serial No. 149,084, filed March 23, 1903, of which this case is a division.

What I claim as new and desire to secure by Letters Patent of the United States, is:

1. In a vapor electric apparatus for rectifying alternating current, a highly exhausted container provided with a condensing chamber, elbows opening out of said condensing chamber, an anode in each elbow, and a coöperating vaporizable cathode.

2. In a vapor electric device for rectifying alternating current, a highly exhausted container provided with a condensing chamber, tubular arms extending outwardly and downwardly from said condensing chamber, electrodes in the downwardly extending parts of said tubular arms, and a coöperating vaporizable cathode.

3. In a vapor electric device for rectifying alternating current, the combination of an exhausted container having a condensing chamber and a plurality of outwardly projecting extensions opening into the lower part of said condensing chamber, electrodes in said extensions, and a coöperating vaporizable electrode.

4. In a vapor electric device for rectifying alternating current, the combination of an exhausted container having a condensing chamber and a plurality of arms projecting therefrom laterally and closed at their outer ends, each being out of alinement with the adjacent arms, anodes in said arms near the outer ends thereof, and a vaporizable cathode for coöperating with said anodes.

In witness whereof, I have hereunto set my hand this 18th day of November, 1910.

EZECHIEL WEINTRAUB.

Witnesses:
JOHN A. McMANUS, Jr.,
FRANK G. HATTIE.